(12) United States Patent
Yamada

(10) Patent No.: US 11,474,763 B2
(45) Date of Patent: Oct. 18, 2022

(54) OUTPUTTING PRECEDING PRINTER COMMAND BASED ON PRINTER MODEL INFORMATION

(71) Applicant: BROTHER KOGYO KABUSHIKI KAISHA, Nagoya (JP)

(72) Inventor: Kazutaka Yamada, Nagakute (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 13 days.

(21) Appl. No.: 16/693,501

(22) Filed: Nov. 25, 2019

(65) Prior Publication Data

US 2020/0174727 A1 Jun. 4, 2020

(30) Foreign Application Priority Data

Nov. 30, 2018 (JP) .............................. JP2018-224996

(51) Int. Cl.
*G06F 3/12* (2006.01)
*H04N 1/00* (2006.01)

(52) U.S. Cl.
CPC .......... *G06F 3/1255* (2013.01); *G06F 3/1206* (2013.01); *G06F 3/1231* (2013.01); *G06F 3/1259* (2013.01); *H04N 1/00623* (2013.01)

(58) Field of Classification Search
None
See application file for complete search history.

(56) References Cited

U.S. PATENT DOCUMENTS

| | | | |
|---|---|---|---|
| 2002/0030846 A1* | 3/2002 | Moriyama | G06K 15/00 358/1.9 |
| 2004/0184081 A1 | 9/2004 | Yamamoto | |
| 2008/0123135 A1* | 5/2008 | Inoue | H04N 1/00973 358/1.15 |
| 2009/0040551 A1* | 2/2009 | Ohara | G06F 3/1218 358/1.15 |
| 2012/0236346 A1 | 9/2012 | Miyabe | |
| 2015/0277827 A1 | 10/2015 | Donami | |

(Continued)

FOREIGN PATENT DOCUMENTS

| | | |
|---|---|---|
| JP | 2000-163225 A | 6/2000 |
| JP | 2005-1 82486 A | 7/2005 |

(Continued)

OTHER PUBLICATIONS

English language machine translation of JP 2005-182486 A to Hosokawa (Year: 2005).*

(Continued)

*Primary Examiner* — Eric A. Rust
(74) *Attorney, Agent, or Firm* — Scully, Scott, Murphy & Presser, PC

(57) ABSTRACT

A supporting program according to aspects of the present disclosures can be executed by a CPU of a PC and corresponds to a printer connected to the PC. When the PC receives a print instruction to cause the printer to perform printing through a general-use printing program implemented in the OS of the PC, in advance, the supporting program causes the PC to output a preceding operation command to cause the printer to perform a preceding operation before starting printing. The printer performs a preceding operation corresponding to the preceding operation command.

17 Claims, 6 Drawing Sheets

(56) References Cited

U.S. PATENT DOCUMENTS

| | | |
|---|---|---|
| 2017/0220909 A1 | 8/2017 | Yamada |
| 2017/0223210 A1 | 8/2017 | Yamada |
| 2018/0143793 A1 | 5/2018 | Kobayashi |

FOREIGN PATENT DOCUMENTS

| | | |
|---|---|---|
| JP | 2015-191645 A | 11/2015 |
| JP | 2017-134718 A | 8/2017 |
| JP | 2017-134720 A | 8/2017 |

OTHER PUBLICATIONS

English language machine translation of JP 2000-163225 A to Yamamoto (Year: 2000).*
International Search Report and Written Opinion dated Jan. 28, 2020 of a corresponding International PCT Application PCT/JP2019/045949.
Extended European Search Report dated Mar. 30, 2022 from related EP 19890041.7.

* cited by examiner

OUTPUTTING PRECEDING PRINTER COMMAND BASED ON PRINTER MODEL INFORMATION

CROSS-REFERENCE TO RELATED APPLICATIONS

This application claims priority under 35 U.S.C. § 119 from Japanese Patent Application No. 2018-224996 filed on Nov. 30, 2018. The entire subject matter of the application is incorporated herein by reference.

BACKGROUND

Technical Field

The technical field disclosed in the present specification relates to a non-transitory computer-readable recording medium containing instructions realizing a support program which supports control of a printer, an information processing apparatus and a printing method.

Related Art

As a technique to control a printer from an information processing apparatus such as a personal computer (hereinafter, abbreviated as a "PC"), a configuration of installing a printer driver in the information processing apparatus, generating print data using the printer driver and transmitting the print data has been widely known.

SUMMARY

Recently, a technique of controlling a printer using a printing program which is standardly implemented in an operating system (OS), without using the above-mentioned printer driver, has been in practical use. According to such a technique, when the OS detects a printer, the OS associates the detected printer with the OS-standard printing program. Thereafter, it becomes possible that, when a print instruction corresponding to the printer is received, printing is performed using the OS-standard printing program, without using the printer driver.

When printing operations with use of the OS-standard printing program is performed, all the functions of the printer may not be used. For example, regarding functions the printer uniquely provided to the printer may not be supported by the OS-standard printing program. In such a case, the capability the printer originally has may not be fully used.

The present specification discloses a technique of, in an information processing apparatus in which an OS-standard printing program is implemented, exhibiting capability intrinsic to the printer even when printing using the OS-standard printing program is performed.

According to aspects of the present disclosure, there is provided a non-transitory computer-readable recording medium for an information processing apparatus. The information processing apparatus has a controller. The recording medium contains computer-executable instructions realizing a supporting program corresponding to a printer connected to the information processing apparatus. The supporting program causes, when executed by the controller, the information processing apparatus to perform a command outputting process of outputting a preceding operation command to the printer through a communication interface of the information processing apparatus when a print instruction to cause the printer to perform printing is received through a printing program. The preceding operation command causes the printer to perform a preceding operation before starting the printing. The printing program is a program implemented in an operating system of the information processing apparatus. The print instruction is an instruction to cause a printer connected to the information processing apparatus to perform printing.

BRIEF DESCRIPTION OF THE ACCOMPANYING DRAWINGS

DETAILED DESCRIPTION OF THE EMBODIMENT

Hereinafter, referring to the accompanying drawings, a print system using programs according to the embodiment will be described in detail. The present embodiment shows a concrete example of the print system including a personal computer (hereinafter, referred to as a "PC") and a printer.

Figure 1:
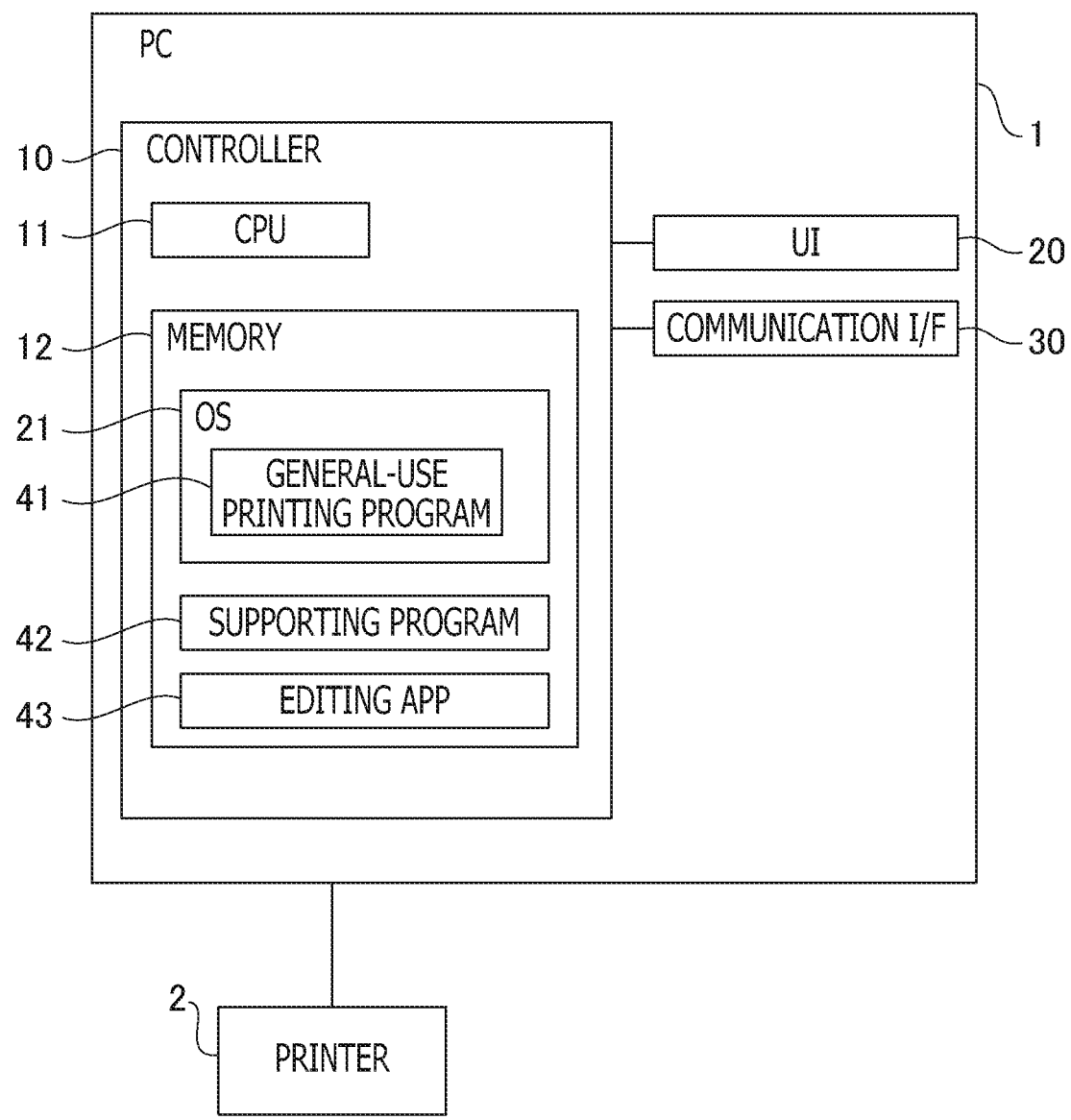
FIG. 1 is a block diagram showing an electrical configuration of a print system according to an embodiment of the present disclosures.

An example of a configuration of a print system in which programs according to the embodiment are executed is shown in FIG. 1. The system shown in FIG. 1 includes a PC 1 and a printer 2. The PC 1 is an example of an information processing apparatus. The printer 2 is device having a printing function and are configured to communicate with the PC 1 through a local communication or a network communication.

As shown in FIG. 1, the PC 1 includes a controller 10, a user interface (hereinafter, referred to as a "UI") 20 and a communication interface (hereinafter, referred to as a "communication I/F") 30. The UI 20 and the communication I/F 30 are electrically connected to the controller 10.

The UI 20 includes hardware configured to display various pieces of information and receive user's input of instructions. The UI 20 may include a touch panel having both an input receiving function and a displaying function, or a combination of a display having a displaying function and a keyboard or a mouse having an input receiving function.

The communication I/F 30 includes hardware for communicating with the printer 2 and a hardware for accessing the Internet. The communication I/F 30 may include multiple interfaces respectively employing different communication methods. Examples of the communication methods may include the network communication, a USB communication and the like.

The controller 10 includes a CPU 11 and a memory 12. The CPU 11 is an example of a computer. The memory 12 includes a ROM, a RAM and a non-volatile memory and stores various application programs (hereinafter, referred to as "APP's") and various pieces of data. According to the present specification, the details of the memory will not be distinguished from each other. The CPU 11 performs various processes in accordance with programs retrieved from the memory 12 or in accordance with user's instructions. It should be noted that the controller 10 in FIG. 1 is a collective name including hardware and software used to control the PC 1 and does not necessarily represent a single piece of hardware.

An example of the memory 12 may be a computer-readable storage medium. The computer-readable storage medium is a non-transitory medium. Examples of the non-transitory medium are, besides the above-described memory 12, recording mediums such as a CD-ROM, a DVD-ROM and the like. It is noted that the non-transitory medium is also a tangible medium. In contrast, an electric signal carrying a program, which is being downloaded from a server on the Internet, is a signal medium which is a kind of computer-readable media, but not included in the non-transitory computer-readable medium.

The memory 12 stores, as shown in FIG. 1, the OS 21 implemented with a general-use printing program 41, a supporting program 42 and an editing APP 43. The supporting program 42 is an example of a supporting program. The supporting program 42 is, for example, a hardware support APP (abbreviated as HSA) of which specification is published by Microsoft Corporation. The OS 21 is, for example, Microsoft Windows®, MacOS® or Linux®. It is noted that, in the memory 12, in addition to the data/APP shown in FIG. 1, various pieces of data including information regarding connected device, various programs of browser and the like are stored.

It is noted that processes and process steps of each flowchart described below basically indicate processes of the CPU 11 in accordance with instructions described in respective programs such as the supporting program 42. That is, in the following description of the processes and steps, terms "determine," "extract," "select," "calculate," "identify," "obtain," "receive," "control" and the like are those performed by the CPU 11. It is noted that the processes by the CPU 11 include controlling of hardware using an API of the OS 21. In the following description, operations of the programs will be described with omitting the detailed description of the OS 21. That is, in the following description, a description "a program B controls hardware C" may be interpreted to "a program B uses the API of the OS 21 to control the hardware C." Further, a process of the CPU 11 in accordance with the instruction described in a program may be described in a simplified manner. For example, the name of the program is omitted and simply described such that "the CPU 11 performs." Further, a process of the CPU 11 in accordance with an instruction described in the program may be described in a simplified manner such that "the program A performs" with omitting the term "CPU."

It should be noted that the term "obtain" is used to mean that a request is not necessarily be made. That is, a process of the CPU 11 to receive data without any request is included within a concept that "the CPU 11 obtains data." Further, the term "data" in the present specification is used to mean a bit array readable by a computer. Multiple pieces of data having different formats but substantially the same contents will be treated as the same data. So is the information in the present specification. It is noted that terms "request" and "instruct" represent concepts of outputting information indicating something is requested and information indicating something is instructed, respectively. It is also noted that information representing something is requested or something is instructed may be simply referred to by terms "request" or "instruct."

Further, a process of the CPU 11 to determine whether or not information A indicates an event B may be described conceptually such that "the CPU 11 determines whether event B or not based on information A." Furthermore, a process of the CPU 11 to determine whether information indicates event B or event C may be described conceptually such that "the CPU 11 determines whether event B or event C based on information A."

The general-use printing program 41 is an APP to cause a printer (various printers such as the printer 2) to perform printing from the PC 1. The general-use printing program 41 is an OS-standard printing program which is implemented in the OS 21 in advance. The general-use printing program 41 according to the present embodiment is configured to generate print data the printer can use for printing based on image data subjected to be printed. The general-use printing program 41 is an example of a printing program.

The general-use printing program 41 is a general-purpose APP which can be used for any of a plurality of models of printers supplied by various device venders. The general-use printing program 41 is configured to cause any of the plurality of models of printers to perform operations which are commonly implemented in the plurality of models of printers. Alternatively, the general-use printing program 41 may be a program supplied from the device venders to a vender of the OS 21 so that the general-use printing program 41 is implemented in the OS 21 (e.g., a kind of printer driver supplied by a device vender to be implemented in the OS 21).

Programs developed by respective venders of the devices after the general-use printing program 41 to be implemented in the OS 21 has been supplied to the vender of the OS 21 can be added to the PC 1 by installing the same. In the following description, printer drivers which can be added to the PC 1 by installation (i.e., not the program which has been implemented in the OS 21 in advance) will be simply referred to as the "printer drivers" or "vender drivers." In other words, the "printer driver" is not the program which has been implemented in the OS 21 in advance but a program which needs to be installed in the OS 21 according to a particular process in order to user the same. For example, an installer designated through the UI 20 or the OS 21 installs the printer driver in the OS 21. The printer drivers are prepared by the venders of the printers so as to correspond to respective models of the printers. Thus, a printer driver corresponding to a particular printer may be configured to receive instructions to perform functions which are intrinsic to the particular printer.

There may be a case where the printer driver, or the vender driver exhibits a higher performance than the general-use printing program 41 implemented in the OS 21 in advance. To have the higher performance may include, for example, that the print data generated by the printer driver is processed more efficiently by the printer than the print data generated by the general-use printing program 41, and thus, a printing speed of the print data generated by the printer driver is faster than the printing speed of the image data generated by the general-use printing program 41. Optionally or alternatively, to have the higher performance may include, for example, that the print data generated by the printer driver is processed with use of less memory amount. Further, an example of the higher performance may include that the print data generated by the printer driver causes the printer to print a printed matter having a better color developing property than the print data generated by the general-use printing program 41. Further, an example of the higher performance may mean that the print data generated by the printer driver causes the printer to print a printed matter having a higher printing resolution than the print data generated by the general-use printing program 41. Further, an example of the higher performance may mean that the printer driver instructs the printer to perform a function intrinsic to the printer which cannot be instructed by the general-use printing program 41. In this case, the function intrinsic to the printer may include, for example, a mirror-reversed printing function and a black/white inversion printing function.

The supporting program 42 is a program which performs processes based on the instruction by the OS 21 in association with the startup of the general-use printing program 41 and supports controlling of hardware subjected to the instruction. The supporting program 42 is started, for example, by the OS 21. The supporting program 42 is an APP corresponding to a model of the printer 2, which is subjected to be controlled. Typically, the supporting program 42 is prepared by the vender of the device (e.g., the printer) subjected to be controlled. Generally, the vender of the device registers the supporting program 42 with a platform supplied by the vender of the OS 21 in accordance with a procedure designated by the vender of the OS 21. When a printer 2 is newly connected to the PC 1 and the supporting program corresponding to the printer 2 is registered with the platform, the OS 21 downloads the supporting program 42 from a sever in which the supporting program 42 is stored and incorporates the same in the PC 1. According to the present embodiment, the supporting program 42 used in the printer 2 is the same APP used in the printer 3.

The OS 21 associates identification information of the incorporated supporting program 42 with the printer information of the connected printer 2 and stores the same in the memory 12. In the PC 1 to which a plurality of modes of printers are connected, a plurality of supporting programs respectively corresponding to the plurality of models are incorporated, and information associating the plurality of printers with the plurality of supporting programs is stored in the memory 12. That is, in the memory 12, as the printer information for each of the printers connected to the PC 1, information on the corresponding supporting program 42 is stored in addition to the model information and the access information of each printer.

The editing APP is, for example, an APP for generating and/or editing image data and document data. Examples of the editing APP 43 are Microsoft Word® and Power Point®. The editing APP 43 is configured to receive a user operation including an instruction to cause the printer 2 to perform a particular operation. The editing APP 43 is configured to receive a print instruction which causes the printer 2 to perform printing through the UI 20.

Figure 2:
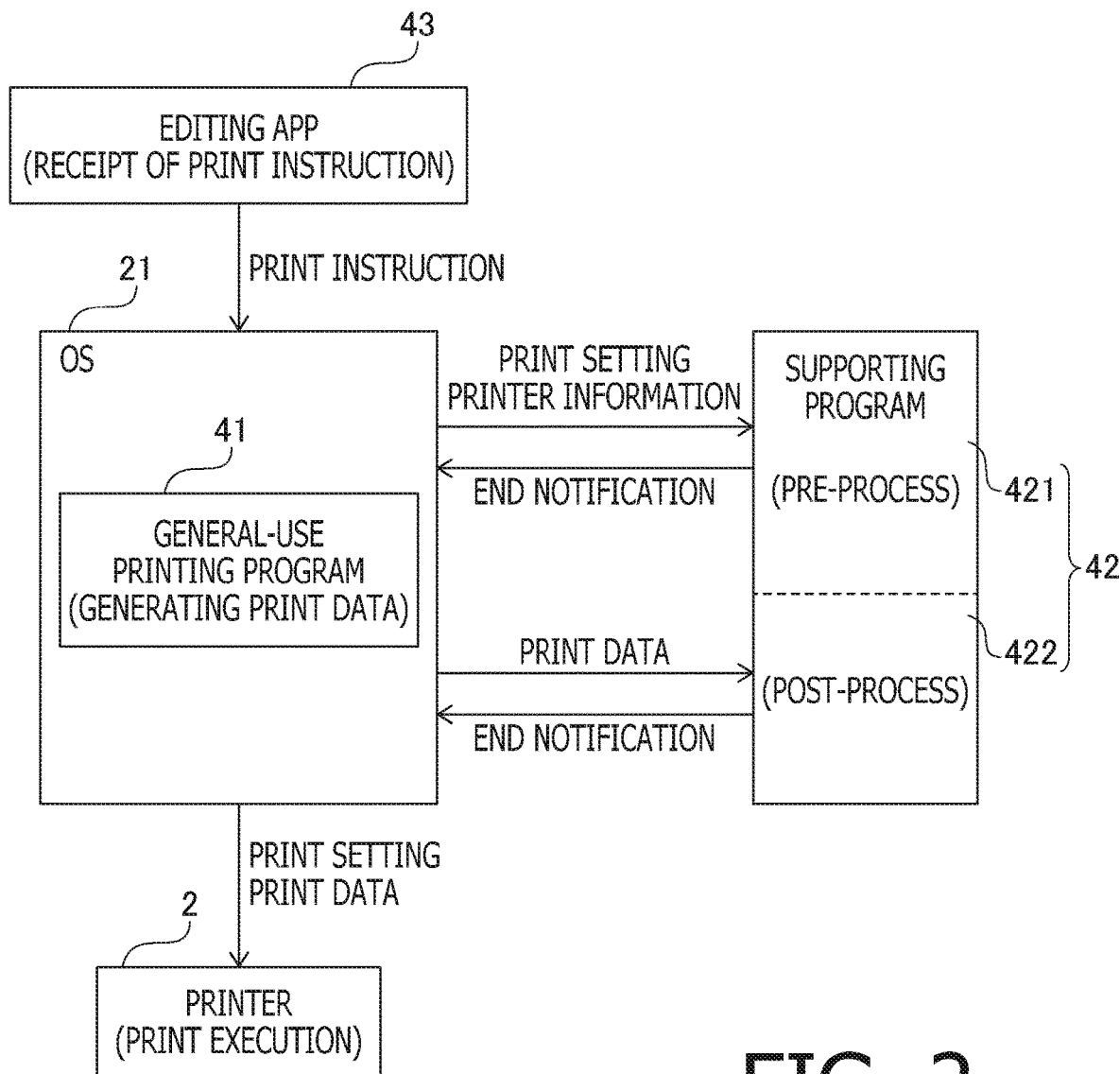
FIG. 2 shows an order of processes performed by respective programs.

Next, an order of processes performed by respective programs will be described, referring to FIG. 2. In the following description, a case where the PC 1 receives, by the editing APP 43 through the UI 20, an instruction to designate image data subjected to print and an instruction to perform printing with the printer 2 through the general-use printing program 41 will be described.

The editing APP 43, which has received the printing instruction, transmits a print execution notification to OS 21 based on the received print instruction. The print execution notification contains, for example, information indicating the printer designated by the print instruction, a print parameter, print settings and information indicating the image data designated by the print instruction. Next, when the supporting program 42 corresponding to the printer 2, which is the printer designated by the print instruction, is stored in the memory 12, the OS 21 instructs the supporting program 42 to perform the process by the supporting program 42 before generation of the print data by the general-use printing program 41.

The supporting program 42 includes a pre-process to be performed before the process by the general-use printing program 41 is started and a post-process to be performed after the process by the general-use printing program 41 is finished and before the print data is transmitted to the printer 2. In the following description, a part of the process among the processes of the supporting program 42 and performed before the process of the general-use printing program 41 is started will be described as a process of a "pre-process supporting program 421" and a part of the process among the processes of the supporting program 42 and performed after the process by the general-use printing program 41 is finished will be described as a process of a "post-process supporting program 422."

In the PC 1 according to the present embodiment, in response to receipt of the print instruction, the process of the pre-process supporting program 421 is performed before the print data is generated by the general-use printing program 41. The pre-process supporting program 421 is configured to obtain various pieces of information contained in the print instruction (e.g., information indicating the print setting, information indicating the printer and the like) from the OS 21. The pre-process supporting program 421 performs the pre-process based on the obtained information and the pre-process supporting program 421 itself and returns an end notification to the OS 21 after the process is finished. Details of the pre-process by the pre-process supporting program 421 will be described later.

When the end notification is received from the pre-process supporting program 421, the OS 21 performs a process based on the general-use printing program 41. The general-use printing program 41 generates the print data from the image data, in accordance with the print instruction.

When the print data has been generated, the OS 21 instructs the post-process supporting program 422 to execute the post-process before transmitting the generated print data to the printer 2. The post-process supporting program 422 is configured to obtain not only information regarding the print setting and the printer but also the print data which has already been generated from the OS 21. The post-process supporting program 422 performs the post process based on the obtained information and the post-process supporting program 422 itself and returns the end notification to the OS 21 after the process is finished. Details of the post process based on the post-process supporting program 422 will be described later.

When the OS 21 receives the end notification from the post-process supporting program 422, the OS 21 transmits the print setting and the print data to the printer 2 through the communication I/F 30. It is noted that there may be a case where the print setting set by the editing APP 43 is changed by the pre-process supporting program 421 or the post-process supporting program 422. The printer 2 performs printing based on the received print setting and the print data.

Figure 3:
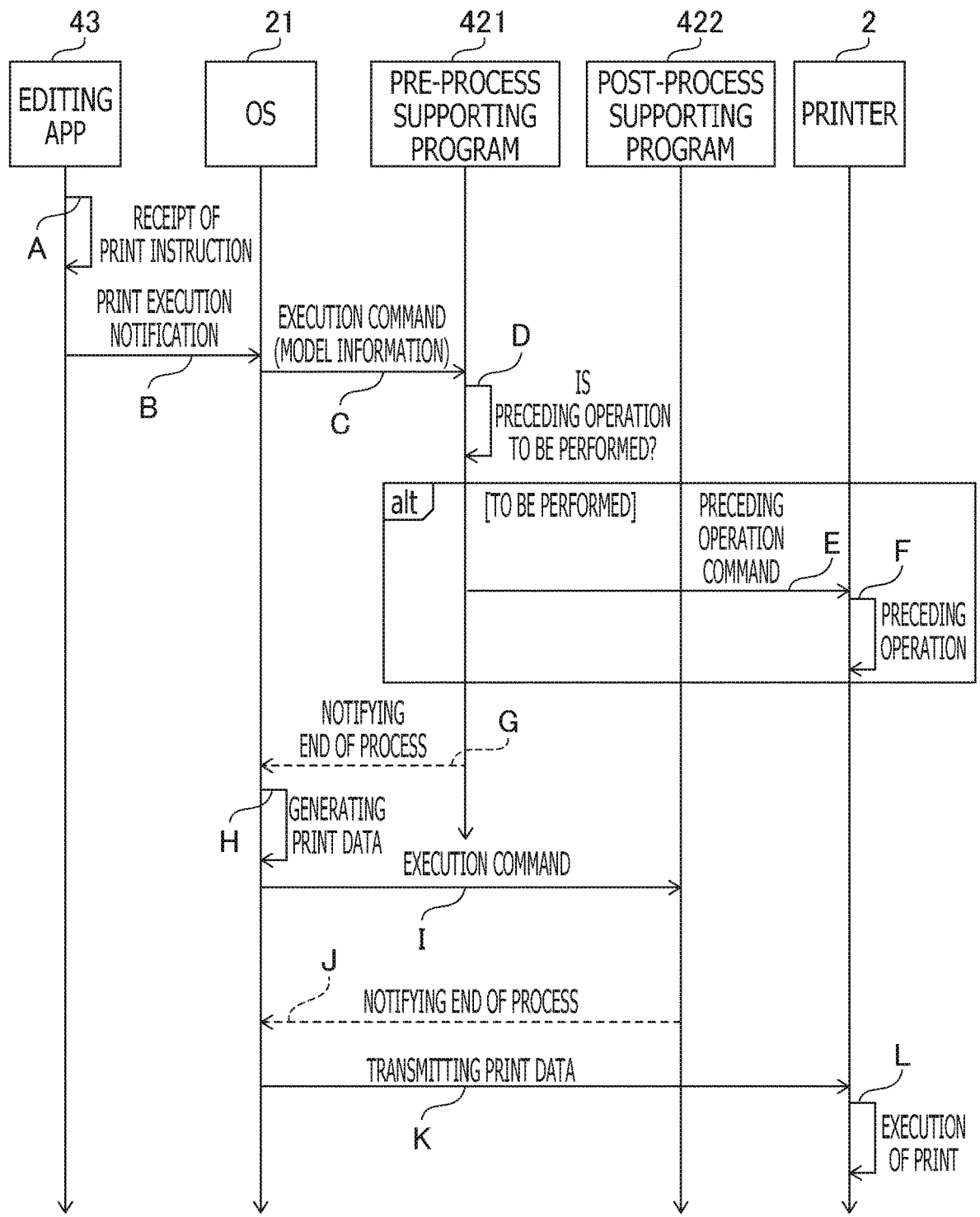
FIG. 3 is a sequential chart illustrating examples of operations of respective programs.

Next, a printing procedure including processes based on the supporting programs 42 will be generally described with reference to a sequential chart shown in FIG. 3. Firstly, the editing APP 43 receives, through the UI 20, designation of the image data subjected to be printed and an instruction to perform printing (arrow A). Then, the editing APP 43 delivers the print execution notification indicating contents of received instruction to the OS 21 (arrow B).

When detecting the print execution notification output by the editing APP 32, the OS 21 identifies a printer designated as a printer to be controlled to perform printing based on the information contained in the print execution notification. For example, when printing with use of the printer 2 in accordance with the general-use printing program 41 is designated, if the supporting program 42 corresponding to the printer 2 has been implemented in the general-use printing program 41, the OS 21 outputs an execution command of the supporting program 42. In response to the OS 21 detecting the print execution notification, the execution command is output to the supporting program 42. Thus, outputting of the execution command by the OS 21 is an example of a detection notification to notify that the print instruction is detected.

When the execution command of the supporting program 42 is output from the OS 21, the supporting program 42 executes a process based on the pre-process supporting program 421 or the post-process supporting program 422. In the example shown in FIG. 3, before the general-use printing program 41 starts generating the print data, the OS 21 outputs the execution command to the supporting program 42 and starts a process based on the pre-process supporting program 421 (arrow C).

The pre-process supporting program 421 according to the present embodiment determines whether the printer 2 is to be caused to perform a preceding operation (arrow D) based on information regarding the printer 2 obtained from the OS 21 and the print parameter. The preceding operation is an operation to make the printer 2 perform preparation for printing before the print data is transmitted. As the PC 1 transmits a command instruction the preceding operation to the printer 2, the printer 2 performs the preceding operation. Further, as the printer 2 performs the preceding operation, a waiting time from the user's input of the print instruction to completion of printing of the first page can be shortened.

Regarding the preceding operation, for example, there are multiple of kinds of preceding operations for each model of the printer 2. In a case where the printer 2 is an inkjet printer, the PC 1 transmits, for example, a command (i.e., an uncap command) instructing the printer 2 to remove a dry preventing cap for a print head from the print head and to move the print head to a print start position, as the preceding operation. In a case where the printer 2 is an electrophotographic printer, the PC 1 transmits, to the printer as the preceding operation, a command causing the printer 2 to start heating a fixing device and start each motor. Further, regardless of a printing method of the printer 2, the PC 1 may transmit a command instructing the printer to perform an operation, as the preceding operation, of withdrawing a printing sheet from the sheet feed tray and conveying the sheet to a particular standby position.

When the pre-process supporting program 421 determines to cause the printer 2 to perform the preceding operation, the pre-process supporting program 421 transmits a preceding operation command which instructs execution of the preceding operation using the IP address of the printer obtained from the OS 21 (arrow E). Accordingly, the printer 2 executes the preceding operation as instructed (arrow F). After transmission of the preceding operation command, the pre-process supporting program 421 notifies the OS 1 of the end of operation (arrow G).

In response to the OS 21 receiving the end notification from the pre-process supporting program 421, the OS 21 generates the print data using the general-use printing program 41 (arrow H). The print data generated with use of the general-use printing program 41 is general-use print data, which can be used by various types of printer 2 for printing.

After generating the print data with use of the general-use printing program 41, the OS 21 outputs the execution command of the process according to the supporting program 42 again (arrow I). Then, the supporting program 42 starts a process according to the pre-process supporting program 422. At this stage, the print data has already been generated, and the printer 2 can start printing when the print data is received. When the post-process is finished, the post-process supporting program 422 notifies the OS 21 of the end of process to (arrow J). In response to the OS 21 receiving the end notification from the post-process supporting program 422, the OS 21 transmits the print data to the printer 2 (arrow K), thereby the printer 2 performing printing (arrow L).

Next, referring to a flowchart shown in FIG. 5, the printing process realizing an operation of the print system according to the present embodiment will be described. The printing process is executed by the CPU 11 of the PC 1 under control of the OS 21, in response to the editing APP 43 receiving the print instruction to cause the printer 2 to perform printing with use of the general-use printing program 41 (arrow A of FIG. 3) and the OS 21 receiving the print execution notification from the editing APP 43 (arrow B of FIG. 3). According to the present embodiment, a procedure when the OS 21 is not compliant to the cancel instruction will be described.

In the printing process, the OS 21 initially determines whether the supporting program 42 is stored in the memory 12 (S101). As mentioned above, regarding the supporting programs 42, ones compliant to respective printers are prepared by the venders of the respective devices, and when the OS 21 detects the printer, the corresponding supporting program 42 is installed in the PC 1. When it is determined that the supporting program 42 is not installed in the PC 1 (e.g., when the supporting program 42 compliant to the printer 2 has not been prepared) (S101: NO), the OS 21 generates the print data with use of the general-use printing program 41 implemented in the OS 21 (S102).

The OS 21 transmits the print data generated in S102 to the printer 2 (S103), and terminates the printing process. The printer 2 performs printing according to the print data received from the PC 1. It is noted that when the PC 1 fails to transmit the print data, the PC 1 may execute a particular error process.

When the supporting program 42 is not installed in the PC 1, the print data is generated with use of the general-use printing program 41. Therefore, the user can use various models of printers 2 in a manner the same as a case where the supporting program 42 is used, without being conscious of a setup of the printer 2. It is noted, however, that, when printing is performed with use of the general-use printing program 41, a relatively longer time may be required and/or quality of printed matter may be lowered in comparison with printing with use of a high-performance printer driver (i.e., the vender driver).

When it is determined that the supporting program 42 is installed in the PC 1 (S101: YES), the OS 21 outputs the execution command to the supporting program 42 corresponding to the printer 2 so that the process according to the pre-process supporting program 421 is started (S105, arrow C of FIG. 3). Then, the CPU 11 performs the pre-process according to the pre-process supporting program 421. For example, the OS 21 may input information indicating the pre-process supporting program 421 in the supporting program 42. Alternatively, the OS 21 stores the information indicating the pre-process supporting program 421 in the memory 12 and then outputs the execution command to the supporting program 42, and the supporting program 42 may retrieve the stored information. Further alternatively, the OS 21 may output the execution command designating a process of the pre-process supporting program 421.

Referring to a flowchart shown in FIG. 5, the pre-process will be described. In the pre-process, the supporting program 42 obtains printer information of the printer which is designated as a device to perform printing based on the print parameter designated by the print instruction (S201). The process in S201 is an example of an obtaining process. It is noted that the pre-process supporting program 421 is capable of obtaining, from the OS 21, the printer information of the printer 2 which is associated with itself or various pieces of information set by the print instruction. Concretely, the supporting program 42 obtains the model information of the printer 2 or the access information such as the IP address by inquiring of the OS 21 or referring to a storage area where the OS 21 stores information.

The supporting program 42 communicates with the printer using the obtained IP address and obtains status information of the printer 2 (S202). The process in S202 is an example of a first status obtaining process. The status information of the printer 2 includes, for example, a "standby" state a "printing" state, a "preparing" state or an "error" state.

When the status information indicates the "standby" state, the printer 2 is in a state of waiting for receipt of the print data. The "preparing" state indicates that the printer 2 is in a state of performing a preparation operation to prepare for printing. The "printing" state indicates that the printer 2 has already received the print data, and the printer 2 is in a state of currently performing printing thereof. When the status information indicates the "printing" or "preparing," the preparation operation for printing is currently being performed or has been finished. Therefore, it is unnecessary to transmit the preceding operation command to the printer 2 again. The "error" state indicates that the printer 2 is unable to perform printing since, for example the printer 2 runs short of ink, a cover of the printer opens and the like. Further, when the supporting program 42 and the printer 2 cannot communicate with each other, or when the printer 2 is not powered on, the supporting program 42 is unable to obtain the status information from the printer. It is noted that the status information of the printer 2 may be obtained from a status monitor such as the OS 21 instead of directly obtaining the same from the printer 2.

Figure 4:
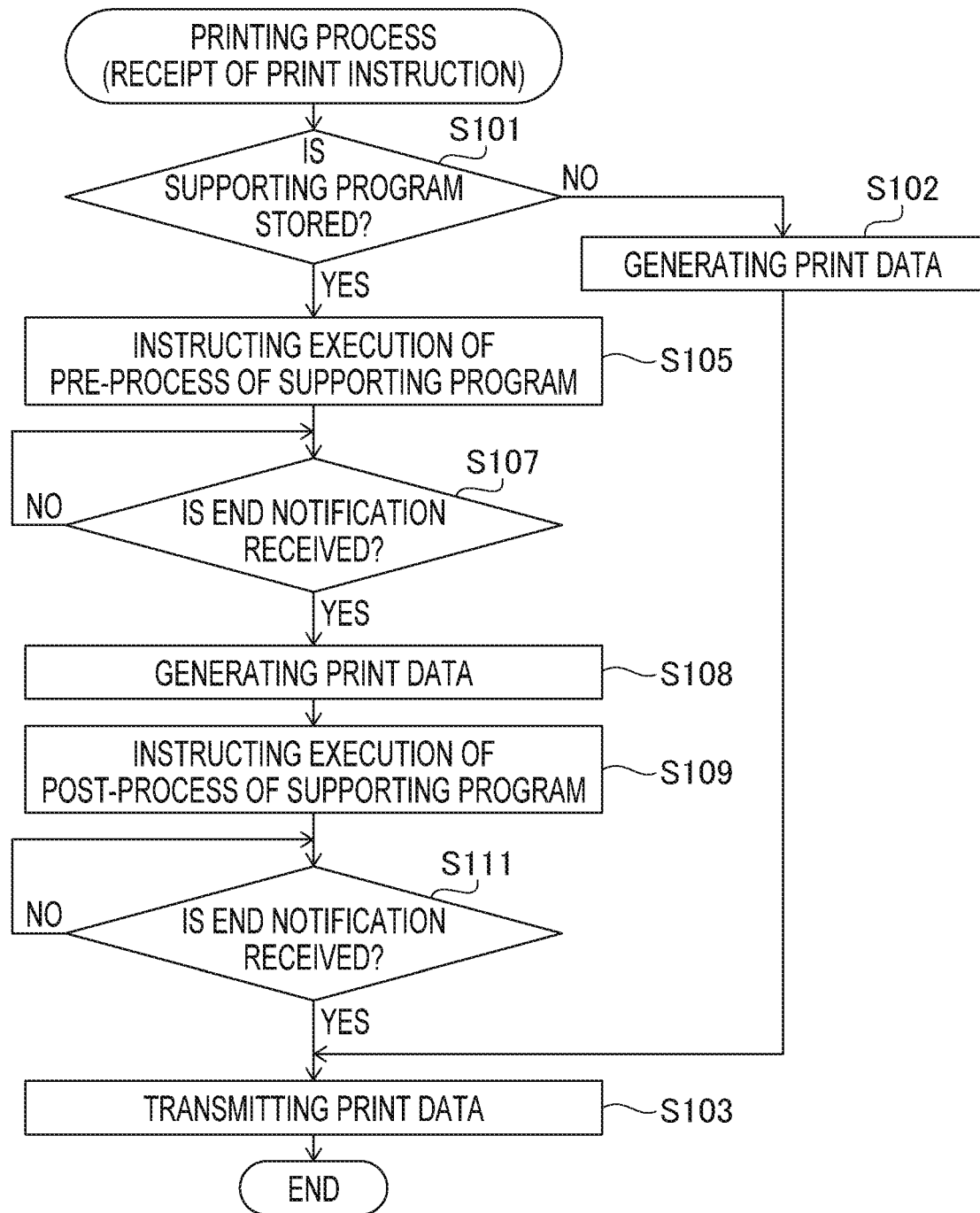
FIG. 4 is a flowchart illustrating a printing process according to the embodiment.

Then, the supporting program 42 determines whether the state of the printer 2 is the "standby" state (S203, arrow D in FIG. 4). When it is determined that the printer 2 is in the "standby" state (S203: YES), the supporting program 42 generates the preceding operation command to instructs the printer 2 to perform the preceding operation. For this purpose, the supporting program 42 obtains preparation commands for respective models of the printers 2 (S204). The preparation commands are preliminarily defined commands, such as the uncap command for the inkjet printer, regardless of the print parameters. The supporting program 42 stores the preparation commands in association with the model names of the printers.

Next, the supporting program 42 obtains the print parameter based on the information contained in the print execution notification (S205). The supporting program 42 according to the present embodiment particularly obtains information regarding sheet size and information regarding setting of the sheet feed trays from the print parameters. Then, the supporting program 42 determines the sheet feed tray to be used as the sheet feed source based on the print parameters (S206).

The supporting program 42 obtains the information regarding the sheet feed trays of the printer 2 by, for example, communicating with the printer 2. Alternatively, in a case where the information regarding the sheet feed trays of the printer 2 is stored in the memory 12 in advance, the supporting program 42 retrieves the information regarding the sheet feed trays from the memory 12. Then, when the sheet feed tray is designated in the print parameter, the supporting program 42 determines the designated sheet feed tray as the sheet feed tray to be used as the sheet feed source. In a case where the sheet feed tray is to be set automatically, the supporting program 42 determines the sheet feed tray which is set as a default tray is determined to be the sheet feed tray used as the sheet feed source. When the printer 2 has a plurality of sheet feed trays, and the plurality of sheet feed trays accommodates different sizes of the sheets, respectively, the supporting program 42 may determine the sheet tray to be used as the sheet feed source based on the information regarding the sheet sizes in the print parameters.

Then, the supporting program 42 generates a sheet feed command instructing an operation to start feeding of a printing sheet from the determined sheet feed tray (S207). Further, the supporting program 42 synthesizes the preparation command obtained in S204 and the sheet feed command generated in S207 to generate the preceding operation command (S208). Further, the supporting program 42 transmits the generated preceding operation command to the printer 2 using the IP address obtained in S201 (S209, arrow E in FIG. 3). The process in S209 is an example of a command outputting process. Further, the supporting program 42 adds information indicating that the preceding operation command has already been transmitted to the print parameter (S210).

After execution of S210 or when it is determined that the status of the printer 2 is not the "standby" state (S203: NO), the supporting program 42 notifies of the end of pre-process (S211, arrow G in FIG. 3) and terminates the pre-process. The end notification is delivered from the pre-process supporting program 421 to the OS 21.

Figure 5:
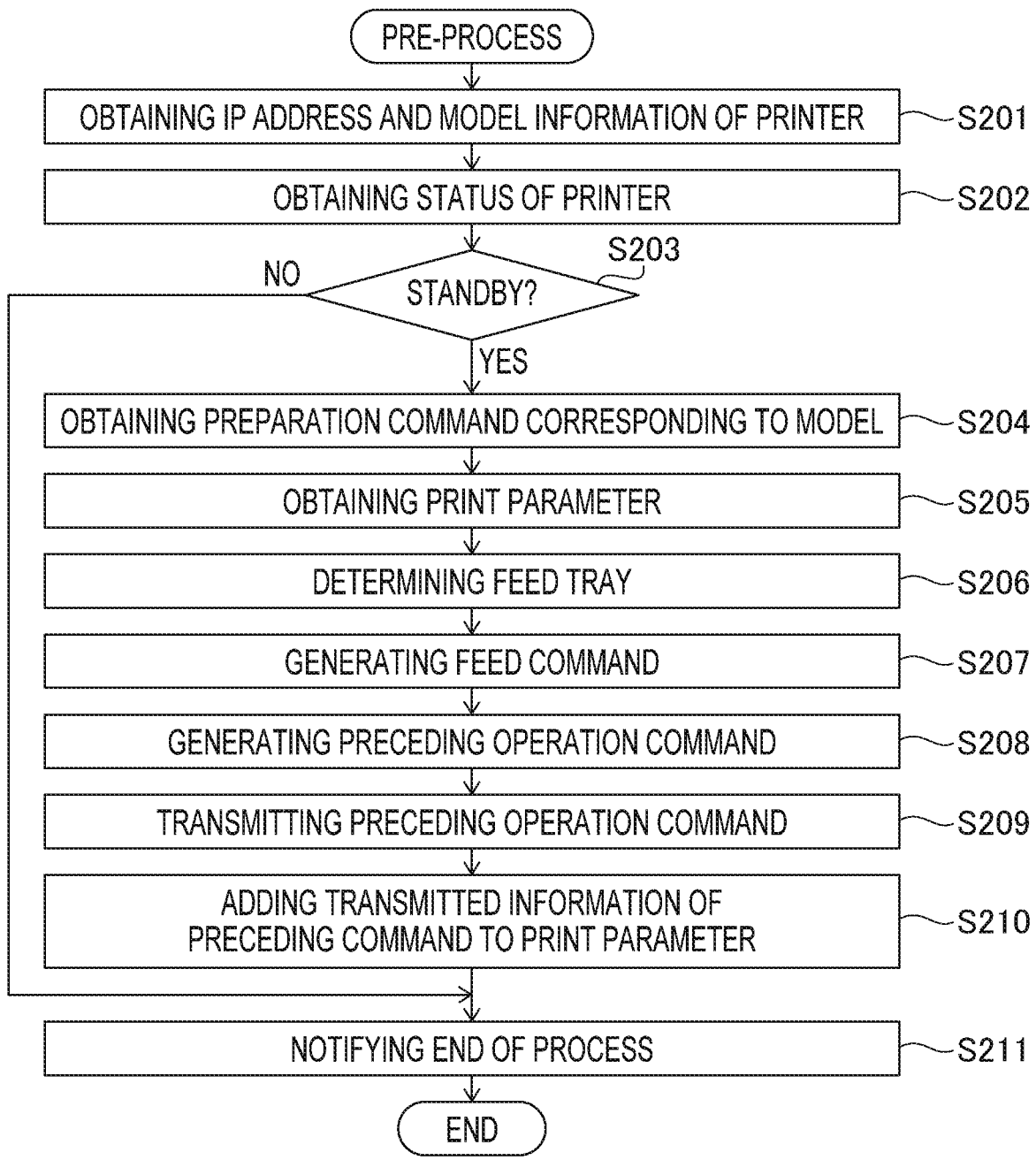
FIG. 5 is a flowchart illustrating a pre-process according to the embodiment.

Returning to the printing process shown in FIG. 5, the OS 21 determines whether the end notification is received from the pre-process supporting program 421 (S107). When the pre-process is terminated, the OS 21 receives the end notification for the pre-process supporting program 421. When it is determined that the end notification is not received (S107: NO), the OS 21 awaits until the end notification is received.

When it is determined that the end notification is received (S107: YES), the OS 21 generates the print data with use of the general-use printing program implemented in the OS 21 (S108, arrow H in FIG. 3). The process in S108 is the same process as in S102. After the print data is generated, before transmitting the generated print data to the printer 2, the OS 21 outputs the execution command to the supporting program 42 corresponding to the printer 2 to start a process according to the post-process supporting program 422 (S109, arrow I in FIG. 3). The CPU 11 executes the post-process according to the post-process supporting program 422.

Figure 6:
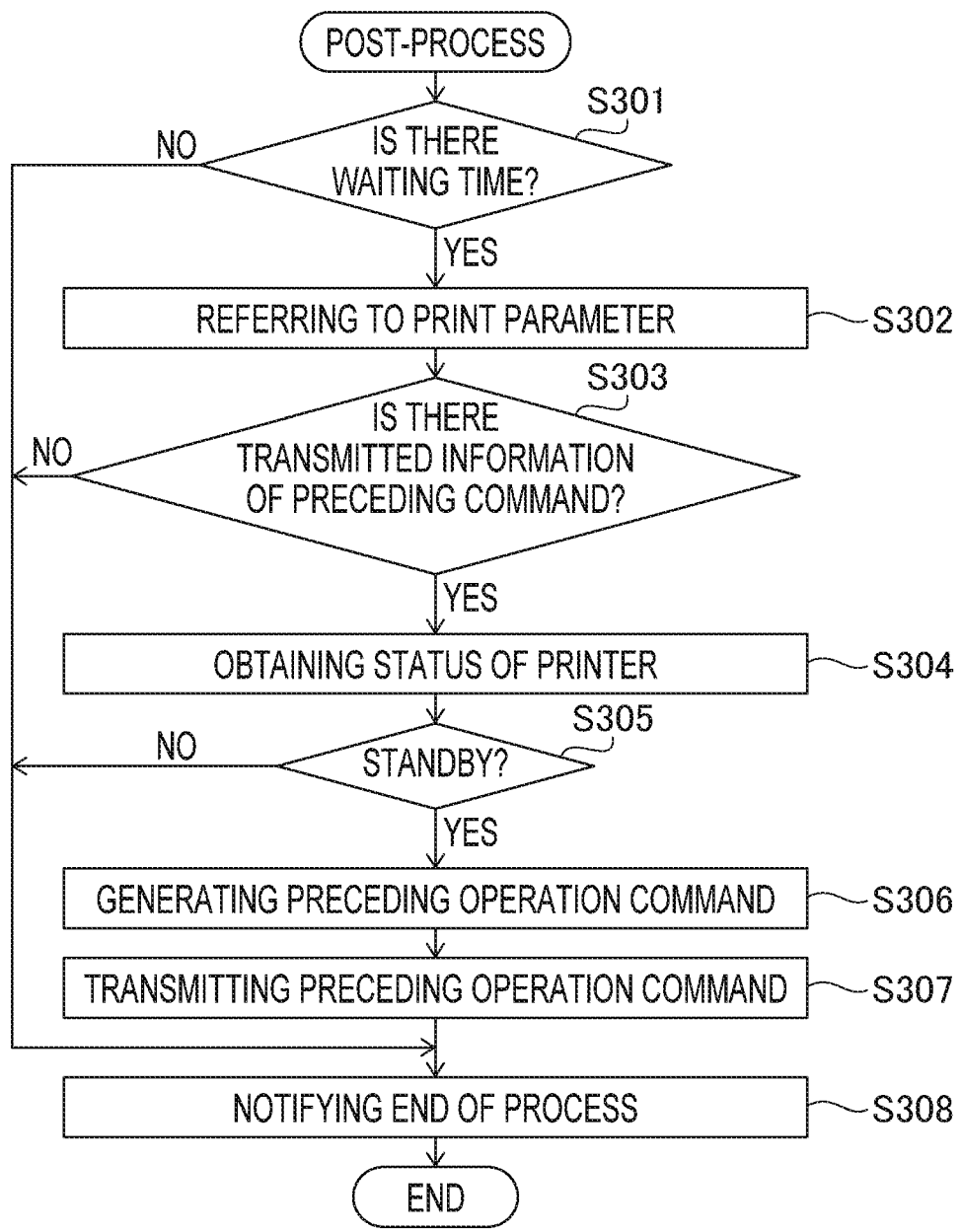
FIG. 6 is a flowchart illustrating a post-process according to the embodiment.

The post-process will be described referring to a flowchart shown in FIG. 6. In the post-process, the supporting program 42 determines whether there is a particular waiting time until start of transmission of the print data to the printer 2 (e.g., whether a data checking of the print data generated by the general-use printing program 41 is to be performed) (S301).

The printer 2 immediately starts printing in response to receipt of the print data. Since the print data has been generated at this stage, the PC 1 can cause the printer 2 to start the printing operation by transmitting the generated print data to the printer 2. That is, when the print data can be transmitted from the PC 1 to the printer 2 immediately, it is better to transmit the print data to the printer in comparison with transmitting of the preceding operation command to cause the printer 2 to perform the preceding operation. It is noted, however, when some process should be applied to the generated print data such as checking of the print data before transmitting the same to the printer 2, the preceding operation command may be transmitted in the post-process as needed.

When it is determined that there is a waiting time (S301: YES), the supporting program 42 refers to the print parameter (S302). Then, the supporting program determines whether information indicating that the preceding command has been transmitted is included in the print parameter (S303). This information is added to the print parameter in S209 when the preceding operation command is transmitted in the pre-process.

When it is determined that the information indicating that the preceding operation has been transmitted is included in the print parameter (S303: YES), the supporting program 42 obtains the status of the printer 2 (S304). It is noted that the process in S304 is that of S202 in the pre-process. The process in S304 is an example of a second state obtaining process.

Next, the supporting program 42 determines whether the status of the printer 2 is the "standby" state (S305). When the printer 2 has received the preceding operation command, which is transmitted in the pre-process, and started an operation according to the received preceding operation command, the status of the printer 2 is not the "standby" state but should be the "preparing" state. When the status of the printer 2 is the "standby" state, it is meant that the printer 2 has not received the transmitted preceding operation command or the printer 2 has not started the operation according to the preceding operation command.

When it is determined that the status of the printer 2 is the "standby" state (S305: YES), the supporting program 42 generates the preceding operation command (S306). The process in S306 is the same as that in S208, and when the preceding command generated in S208 is stored in the memory 12, the supporting program 42 merely retrieves the stored command in S306. Then, the supporting program 42 transmits the generated preceding command to the printer 2 (S307). The process in S307 is an example of a retry process. That is, the supporting program 42 re-outputs the preceding operation command which is the same as that output in the pre-process.

After execution of S307, when it is determined that there is no particular waiting time (S301: NO), when it is determined that the information indicating that the preceding operation command has been transmitted is not included in the print parameter (S303: NO), or when it is determined that the status of the printer 2 is not the "standby" state (S305: NO), the supporting program 42 notifies of end of the post-process (S308, arrow J in FIG. 3), and terminates the post-process. The end notification is delivered from the post-process supporting program 422 to the OS 21.

Returning to the printing process shown in FIG. 5, the OS 21 determines whether the post-process supporting program 422 receives the end notification (S111). When the post-process is finished, the OS 21 receives the end notification from the post-process supporting program 422. When it is determined that the end notification has not been received (S111: NO), the OS 21 awaits until the end notification is received.

When it is determined that the end notification is received (S111: YES), the OS 21 transmits the print data to the printer 2 (S103, arrow K in FIG. 3), and terminates the printing process. The printer 2 performs printing in accordance with the print data received from the PC 1 (arrow L in FIG. 3).

As described in detail above, with the supporting program 42 according to the present embodiment, when the OS 21 receives the print instruction through the general-use print program standardly implemented in the OS 21, the supporting program 42 outputs, to the printer 2 subjected to the print instruction, the preceding operation command to cause the printer 2 to perform printer-intrinsic preceding operation. Accordingly, even when the PC 1 received the print instruction through the general-use print program 41, the printer 2 can perform the preceding operation intrinsic to the printer 2 so that the printer can exhibit the printer-intrinsic capability.

Further, the supporting program 42 according to the present embodiment is retrieved from the OS 21 when the print instruction is received, identifies the printer which is the output destination, and can obtain the print parameter. Further, the supporting program 42 can output, in the process of the pre-process supporting program 421, the preceding operation command Therefore, the preceding operation command is output before the OS 21 completes generating the print data, in particular, before the OS 21 starts generating the print data. Accordingly, the printer can starts the preceding operation at an earlier stage and effects of the function intrinsic to the printer are enhanced.

According to the present embodiment, the supporting program 42 obtains the status information of the printer 2 before outputting the preceding operation command. When the status of the printer 2 is the "printing" or "preparing", the supporting program 42 does not transmit the preceding operation command. When the status of the printer 2 is the "printing" or "preparing," execution of the preceding operation is unnecessary. When it is unnecessary to perform the receding operation, an unnecessary process can be avoided by not outputting the preceding operation command.

There could be a case where the supporting program 42 transmits the preceding operation command in the pre-process but the preceding operation command does not reach the printer 2. According to the present embodiment, the status of the printer is checked also in the post-process and output of the preceding operation command is retried. Accordingly, it is easier to make the printer exhibit the function intrinsic to the printer. In particular, since retry of outputting of the preceding operation command is performed before transmission of the print data is completed, the printer can start the preceding operation at an earlier stage, and effects of the function intrinsic to the printer is enhanced.

According to the present embodiment, since the preceding operation commands corresponding to the preparation operations of respective models of printers, usability of the supporting program 42 is improved.

With the supporting program 42 according to the present embodiment, the print parameter can be obtained before generating the print data. Accordingly, by obtaining the print parameter and transmitting the preceding operation command corresponding to the print parameter, usability of the supporting program 42 is improved. For example, as the supporting program 42 transmits different sheet feed commands for multiple sheet feed trays, respectively, it is possible to make the printer 2 perform an appropriate sheet feeding operation, thereby printing being started earlier.

It is noted that the embodiment disclosed in the present specification is only an illustrative examples and is not intended to limit aspects of the present disclosures. Accordingly, the technique disclosed in the present specification can be modified or enhanced without departing from aspects of the disclosures. For example, the device connected to the PC 1 need not be limited to the printer, but any device which has a printing function (e.g., an MFP, a copier, a facsimile machine and the like). Further, the number of printers connected to the PC 1 need not be limited to one but multiple printers may be connected to the PC 1.

In the above-described embodiment, the supporting program 42 includes both the pre-process and the post-process. However, the supporting program 42 may include only one of the same. For example, the supporting program 42 may include only the pre-process supporting program 421 which is started before the print data is generated. Further, the pre-process supporting program 421 and the post-process supporting program 422 are different programs.

When the preceding operation command is transmitted in the pre-process, the post-process may not be performed. That is, the OS 21 may not output the execution command to the supporting program 42 after generation of the print data.

According to the present embodiment, the supporting program 42 synthesizes the preparation command and the sheet feed command to form a single command and transmits the same as the preceding operation command. Alternatively, the supporting program 42 may separately transmit the preparation command and the sheet feed command. Further, the supporting program 42 may transmit only one of the preparation command and the sheet feed command.

According to the present embodiment, the supporting program 42 does not transmit the preceding operation command when the status of the printer 2 is not the "standby" state. However, the supporting program 42 may transmit the same in such a state. Alternatively, the status of the printer 2 may not be checked. For example, S203 and S203 may be skipped so that the supporting program 42 proceeds to S204 after execution of S201.

According to the present embodiment, the preceding operation command is generated from the preparation command and the like and is transmitted. However, the print parameter may be transmitted as the preceding command. For example, the supporting program 42 may skip S206-S208 of the pre-process and transmit, in S209, the print parameter which is obtained in S205. In this case, the printer 2 may be configured such that, if, for example, the printer 2 is in the "standby" state when the print parameter is received, the preceding operation may be performed, while the preceding operation may not be performed In a case where the printer 2 is not in the "standby" state. Further, the printer 2 may be configured such that the printer 2 performs printing when, for example, the printer 2 receives the print data together with the print parameter, or the printer 2 receives the print data within a particular period of time after the print parameter is received, while the printer 2 performs only the preceding operation when the printer 2 does not receive the print data within the particular time period after receipt of the print parameter. Further, in this case, the printer 2 which received the print parameter may perform the preceding operation corresponding to the print parameter. The printer 2 may execute, for example, a preparation operation for color printing when the print parameter contains a color print setting, while executing a preparation operation for printing only in black color when the print parameter contains a monochromatic print setting. For example, in a case where the printer 2 is a laser printer, a calibration process for suppressing color blurring may be performed as a preparation operation for the color printing. In a case where the printer 2 has a finisher and the print parameter contains a process using the finisher, the printer 2 may perform the preparation operation for the finisher when the print parameter is received.

According to the present embodiment, as an operation of the supporting program 42, only a roll of transmitting the preceding operation command is described. However, the supporting program 42 may include further rolls. For example, the supporting program 42 including another roll may perform a process for playing the other roll before S211 of the pre-process or S308 of the post-process. For example, the supporting program 42 including a roll of customizing a printing mode may notify the printer 2 or the OS 21 of information for customization before S211. Further, the supporting program 42 including a process of image processing of the print data may process the print data generated with use of the general-use printing program 41 before S308. Further, the supporting program 42 may perform an operation recommending printing with use of the printer driver, for example, displaying of a message, downloading of an installer, switching to a default printer and the like.

The module that performs the pre-process and the post-process need not be limited to the supporting program 42, but any program which is configured to receive instructions from the OS 21 when printing is performed with use of the general-use printing program 41 of the OS 21. For example, the module may be a Print workflow of which specification is published by Microsoft corporation.

According to the present embodiment, as the execution command of the supporting program 42 is output from the OS 21, the supporting program 42 is started up. However, the startup timing of the supporting program 42 need not be limited to such a timing. For example, the supporting program 42 may be executed all the time. In such a case, the supporting program 42 may perform the above-described operations in response to receipt of the execution command.

In any of the flowcharts disclosed in the embodiment, the order of multiple processes at arbitrary multiple steps may be changed arbitrarily or may be performed in parallel unless there occurs conflicts in processing contents.

The processes disclosed in the present embodiment may be performed by a single CPU, a plurality of CPU's, hardware such as an ASIC or a combination thereof. Further, the processes disclosed in the present embodiment may be realized by various modes such as a non-transitory recording medium storing programs for performing the processes, methods for performing the processes and the like.

What is claimed is:

1. A non-transitory computer-readable recording medium for an information processing apparatus, the information processing apparatus having a controller, the recording medium containing computer-executable instructions realizing a supporting program corresponding to a printer connected to the information processing apparatus, wherein the supporting program causes, when executed by the controller, the information processing apparatus to perform:
a printer information obtaining process of obtaining printer information from an operating system of the information processing apparatus when a print instruction is received through a printing program, the print instruction being an instruction to cause a particular printer among one or more printers connected to the information processing apparatus to perform printing without using a printer driver corresponding to the particular printer, the printing program being a program implemented in the operating system, the printer information obtained in the printer information obtaining process including model information indicating a model of the particular printer instructed by the print instruction;

a command generating process of generating, based on the model information, a preceding operation command causing the printer to perform a preceding operation in accordance with the model of the particular printer before starting the printing; and a command outputting process of outputting the preceding operation command to the particular printer through a communication interface of the information processing apparatus.

2. The non-transitory computer-readable recording medium according to claim 1, wherein the supporting program causes, when executed by the controller, the information processing apparatus to perform an obtaining process of obtaining printer information stored in a memory of the information processing apparatus, and wherein, in the command outputting process, the preceding operation command is output, to the printer through the communication interface, using the printer information obtained in the obtaining process.

3. The non-transitory computer-readable recording medium according to claim 2, wherein the preceding operation command includes multiple kinds of preceding operation commands, wherein the printer information includes model information indicating a model of the printer, and wherein, in the command outputting process, a preceding operation command is output to the printer, the preceding operation command being a command obtained from among the multiple kinds of preceding operation commands in the obtaining process, the preceding operation command corresponding to a model indicated by the model information of the printer information.

4. The non-transitory computer-readable recording medium according to claim 2, wherein the printer information includes access information for accessing the printer, and wherein, in the command outputting process, the preceding operation command is output, to the printer through the communication interface, using the access information.

5. The non-transitory computer-readable recording medium according to claim 2, wherein, when an other supporting program supporting an other printer different from the printer can be implemented in the operating system, and the information processing apparatus stores, in the memory, identification information identifying a supporting program and printer information identifying a printer supported by corresponding supporting program in association with each other for each supporting program implemented in the operating system, the operating system executes a process of a supporting program indicated by the identification information associated with the printer information of the printer subjected to the print instruction.

6. The non-transitory computer-readable recording medium according to claim 1, wherein, in the command outputting process, the preceding operation command is output before the operating system completes generation of print data by the printing program.

7. The non-transitory computer-readable recording medium according to claim 1, wherein, in the command outputting process, the preceding operation command is output before the operating system starts generation of print data by the printing program.

8. The non-transitory computer-readable recording medium according to claim 1, wherein the supporting program causes, when executed by the controller, the information processing apparatus to perform a first status obtaining process after the print instruction to cause the printer to perform printing through the printing program, the first status obtaining process being a process of obtaining status information indicating a status of the printer before the preceding operation command is output in the command outputting process, and wherein the supporting program causes, when executed by the controller, the information processing apparatus to perform the command outputting process when the status information indicating a status where execution of the preceding operation is not necessary is not obtained in the first status obtaining process, and not to perform the command outputting process when the status information indicating a status where execution of the preceding operation is not necessary is obtained in the first status obtaining process.

9. The non-transitory computer-readable recording medium according to claim 1, wherein the supporting program causes, when executed by the controller, the information processing apparatus to perform a second status obtaining process after the preceding operation command is output in the command outputting process, the second status obtaining process being a process of obtaining status information indicating a status of the printer, and wherein the supporting program causes, when executed by the controller, the information processing apparatus to perform a retry process when the status information indicating a status where execution of the preceding operation is not necessary is not obtained in the second status obtaining process, the retry process being a process of re-outputting the preceding operation command to the printer.

10. The non-transitory computer-readable recording medium according to claim 9, wherein, in the command outputting process, the preceding operation command is output before the operating system starts generation of print data by the printing program, and wherein, in the retry process, the preceding command is output after the operating system starts generating the print data by the printing program and before the print data has been transmitted to the printer.

11. The non-transitory computer-readable recording medium according to claim 1, wherein the preceding operation command includes multiple kinds of preceding operation commands, and wherein, in the command outputting process, a print parameter included in the print instruction is obtained, and a preceding operation command is output, the preceding operation command corresponding to the print parameter from among the multiple kinds of preceding operation commands.

12. The non-transitory computer-readable recording medium according to claim 11,
wherein the preceding operation command includes a sheet feed command to cause the printer to start feeding of a printing sheet, and
wherein, in the command outputting process, the sheet feed command to start feeding of a printing sheet from a sheet feed tray designated by the obtained print parameter is output.

13. The non-transitory computer-readable recording medium according to claim 12,
wherein, in the command outputting process, the sheet feed command is output before the operating system has completed generation of print data by the printing program, the sheet feed command being a command to start feeding of the printing sheet from the sheet feed tray designated by the print parameter included in the print instruction.

14. The non-transitory computer-readable recording medium according to claim 1,
wherein, when the operating system is configure to detect the print instruction to cause the printer to perform printing through the printing program, and the operating system is configured to output a detection notification to notify that the print instruction is detected after detecting the print instruction and before start of transmitting, to the printer, print data corresponding to the print instruction, the supporting program causes, when executed by the controller, the information processing apparatus to perform the command outputting process in response to the detection notification being output.

15. The non-transitory computer-readable recording medium according to claim 14,
wherein the operating system outputs the detection notification before starting generation of print data corresponding to the print instruction,
wherein, in the command outputting process, the preceding operation command is output before the operating system starts generation of the print data.

16. An information processing apparatus having a controller and a communication interface,
wherein a support program corresponding to a printer connected to the information processing apparatus is implemented in the information processing apparatus, the supporting program causes, when executed by the controller, the information processing apparatus to perform:

a printer information obtaining process of obtaining printer information from an operating system of the information processing apparatus when a print instruction is received through a printing program, the print instruction being an instruction to cause a particular printer among one or more printers connected to the information processing apparatus to perform printing without using a printer driver corresponding to the particular printer, the printing program being a program implemented in the operating system, the printer information obtained in the printer information obtaining process including model information indicating a model of the particular printer instructed by the print instruction;

a command generating process of generating, based on the model information, a preceding operation command causing the printer to perform a preceding operation in accordance with the model of the particular printer before starting the printing; and a command outputting process of outputting the preceding operation command to the particular printer through the communication interface.

17. A printing method of controlling an information processing apparatus having a controller, a support program corresponding to the printer being implemented in the information processing apparatus, the printer being configured to execute a preceding operation before starting printing, a printing program being implemented in an operating system of the information processing apparatus,
wherein the printing method includes:

obtaining printer information from an operating system of the information processing apparatus when a print instruction is received through a printing program, the print instruction being an instruction to cause a particular printer among one or more printers connected to the information processing apparatus to perform printing without using a printer driver corresponding to the particular printer, the printing program being a program implemented in the operating system, the printer information obtained in the printer information obtaining process including model information indicating a model of the particular printer instructed by the print instruction;

generating, based on the model information, a preceding operation command causing the printer to perform a preceding operation in accordance with the model of the particular printer before starting the printing; and outputting the preceding operation command to the particular printer through a communication interface of the information processing apparatus.

* * * * *

UNITED STATES PATENT AND TRADEMARK OFFICE
CERTIFICATE OF CORRECTION

| | | |
|---|---|---|
| PATENT NO. | : 11,474,763 B2 | Page 1 of 1 |
| APPLICATION NO. | : 16/693501 | |
| DATED | : October 18, 2022 | |
| INVENTOR(S) | : Kazutaka Yamada | |

It is certified that error appears in the above-identified patent and that said Letters Patent is hereby corrected as shown below:

On the Title Page

Item [56] should read:
2015/0277827 A1 10/2015 Oonami

Signed and Sealed this
Tenth Day of January, 2023

Katherine Kelly Vidal
*Director of the United States Patent and Trademark Office*